May 18, 1926.
C. W. CROGAN
MOTOR DRIVEN HANDSAW
Filed Jan. 20, 1925
1,585,535
2 Sheets-Sheet 1
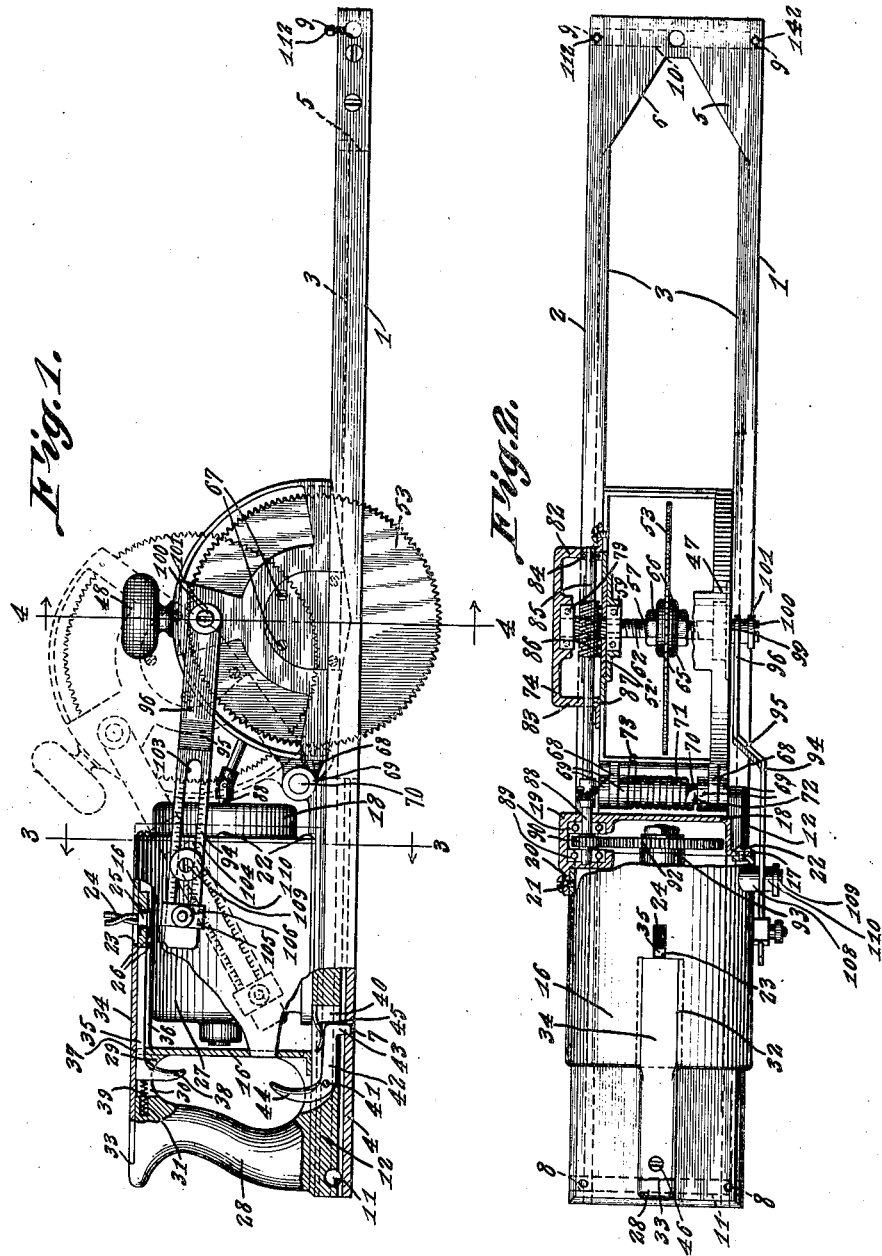
INVENTOR.
Charles W. Crogan.
BY
Geo. P. Kimmel. ATTORNEY.

May 18, 1926.
C. W. CROGAN
MOTOR DRIVEN HANDSAW
Filed Jan. 20, 1925
1,585,535
2 Sheets-Sheet 2
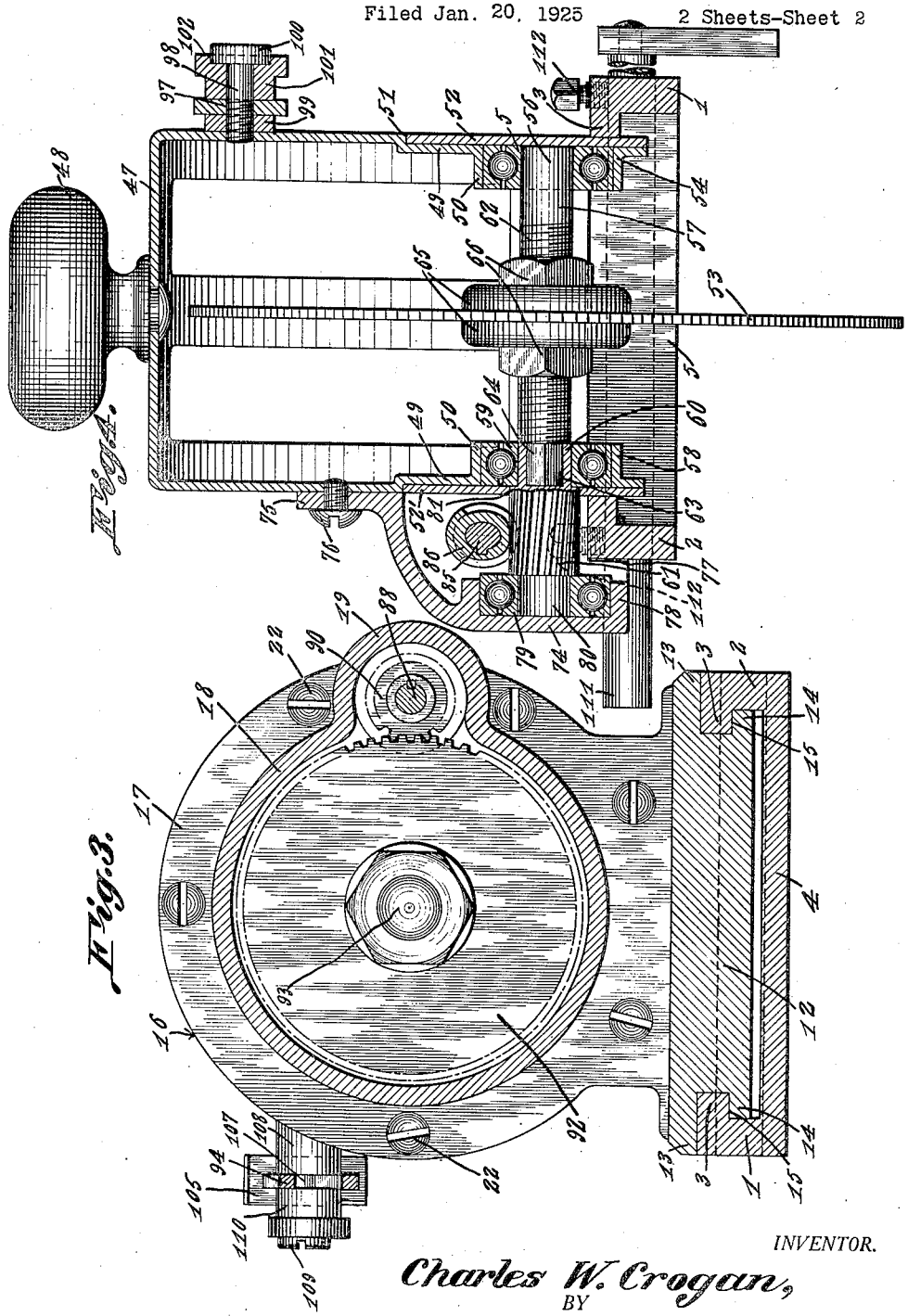
INVENTOR.
Charles W. Crogan,
BY
Geo. P. Kimmel. ATTORNEY.

Patented May 18, 1926.

1,585,535

UNITED STATES PATENT OFFICE.

CHARLES W. CROGAN, OF OLD ORCHARD, MAINE.

MOTOR-DRIVEN HANDSAW.

Application filed January 20, 1925. Serial No. 3,602.

This invention relates to a motor driven hand saw and has for its object to provide, in a manner as hereinafter set forth, a saw of such class capable of being readily handled by the operator and which further can be employed for ripping, cross-cutting or slotting.

A further object of the invention is to provide, in a manner as hereinafter set forth, a saw of the class referred to, with a spring controlled manually shiftable combined guard and saw blade carrier normally maintained elevated to hold the saw blade, when not in use, in safety position or raise to prevent the saw blade from contacting with any object until the combined guard and carrier is shifted manually to position the saw blade for action with respect to the work to be operated upon, whereby when the saw blade is in safety position the teeth thereof are prevented from becoming damaged by impact or contact with the saw support or other object.

A further object of the invention is to provide, in a manner, as hereinafter set forth, a saw of the class referred to with means to provide a combined cut gauging and saw blade setting device co-acting with a combined spring controlled guard and saw blade carrier for regulating the depth of the cut on the operation of the saw.

A further object of the invention is to provide, in a manner as hereinafter set forth, a saw of the class referred to with a combined cut gauging and saw blade setting device connected with and co-acting with a spring controlled combined guard and saw blade carrier and with said device constructed in a manner, that when released from saw blade setting position, will permit of the combined guard and carrier to automatically shift upwardly thereby elevating the saw blade to safety position.

A further object of the invention is to provide, in a manner as hereinafter set forth, a saw of the class referred to, including means for operating the saw blade and a guard to prevent the saw blade when arranged over the work, from cutting therein while the saw blade is operating at a high rate of speed, until said guard is manually shifted in a direction to bring the saw blade to engage the work.

Further objects of the invention are to provide, in a manner as hereinafter set forth, a motor driven hand saw, which is simple in its construction and arrangement, strong, durable, thoroughly efficient and convenient in its use, readily assembled, and comparatively inexpensive to set up.

With the foregoing and other objects in view, the invention consists of the novel construction, combination and arrangement of parts, as hereinafter more specifically described and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:—

Figure 1 is a side elevation, partly in section, of a motor driven hand saw, in accordance with this invention, and further illustrates a saw blade, in full lines in active position and in dotted lines in safety position.

Figure 2 is a sectional plan.

Figure 3 is a section on line 3—3, Figure 1.

Figure 4 is a section on line 4—4, Figure 1.

A motor driven hand saw, in accordance with this invention, when making short cuts, is shiftable upon a track, but when making long cuts the track is shiftable also, and the saw not only includes the track, but also a driving motor, a portable support therefor and which has a part thereof providing a handle for the operator and with the support carrying a motor circuit opening and closing element, a saw blade, a manually shiftable spring controlled combined guard and saw blade carrier pivotally connected to the support, a saw blade operating mechanism carried by the combined guard and carrier and bodily movable therewith, a transmission mechanism carried by the driving motor and its support and having a universal joint connection with said operating mechanism, and a combined cut gauging and setting device for the saw blade and with said device adjustably connected to the portable support and pivotally connected to the combined guard and carrier.

*The track.*—The track, which is set up of any length desired, comprises a pair of side rails 1, 2, each formed on its inner face, at the upper portion thereof, with an inwardly extending flange 3. The flanges 3 extend towards each other and are of a length to extend from the rear end of the track rails to a point removed from the forward end thereof. Formed integral with the track rails, at the rear terminal portion thereof and below the flanges 3 is a closure plate 4 which extends from the rear end of the track rails and terminates at a point between such ends and the transverse center of the track. At the forward end of the track a closure plate 5 is secured to and between the track rails 1, 2 and the rear portion of said plate is of V-shaped contour as indicated at 6. The plate 5 is flush with the tops and bottoms of the track rails 1, 2. The plate 4 is flush with the bottoms of the track rails 1, 2. The plate 4 intermediate at its ends, and at the longitudinal center thereof, is provided with an opening 7. The plate 4, as well as the plate 5, provides a spacing medium for the track rails and each of the latter, in proximity to its rear end, is formed with a transverse opening 8 and in proximity to its forward end with a transverse opening 9, and the said openings 8 register with a transverse opening 11 formed in the rear end of the portable support to be hereinafter referred to, and the openings 9 with a transverse opening in the plate 5.

The purpose of the openings 8, 9, 10, and 11 will be hereinafter set forth.

*The portable support.*—The function of the support is to carry the driving motor as well as the other elements of the saw with the exception of the track. The support includes means for detachably locking it to the track to provide for the bodily shifting of the support and track together when making long cuts and to further enable the releasing of the support from the track to permit of the support shifting on the track when marking short cuts. The support comprises a base or carriage 12 provided with an upper and a lower flange 13, 14, respectively at each side thereof. The flange 13 is of a greater width than the flange 14 and the said flanges 13 are of a width to be flush with the outer sides of the track rails 1, 2. See Figure 3. The flanges 14 are of a width to engage the inner faces of the track rails, but to set up a sliding fit. The flanges 13 and 14 at each side of the base 12 form lengthwise extending guide grooves 15 arranged at the sides of the base 12 and into which extend the flanges 3. By this arrangement a sliding connection is provided between the base 12 and the track rails whereby when the support is released from the track it can be shifted on and guided lengthwise of the track. The opening 11 is formed in the lower portion of the rear of the base 12.

Connected to the base 12 is a cylindrical casing 16, of less length than the length of the base, and which is positioned to have the rear end thereof terminate at a point between the transverse center and the rear end of the base 12 and its forward end to terminate at a point between the transverse center and forward end of the base 12. The forward end of the casing 16 is open and has secured thereto a flange 17 formed on the rear end of a forwardly extended housing 18 of less diameter than the casing 16 and which is provided with a semi-circular offset portion 19, at one side thereof, and said portion 19 provides what may be termed an auxiliary housing having a rearward extension 20 secured to the casing 16 by hold-fast device 21. The housing 18 is secured to the casing 16 by the hold-fast devices 22.

The casing 16 at its top, centrally thereof, is formed with a slot 23 through which extends the motor circuit connections 24 attached to a contact element 25, which coacts with a contact device 26 carried by a driving motor 27 which is fixedly secured within the casing 16. The contact 25 is normally out of engagement with contact device 26.

Formed integral with the rear end of the base 12 is a vertically disposed handle member 28 which is spaced from the closed rear end of the casing 16. Formed integral with the upper end of the member 28 and abutting the upper portion of the rear end of the casing 16 is a connecting piece 29 provided with a vertically disposed opening 30. The member 28 and connecting piece 29 are disposed centrally of the rear end of the casing 16. The member 28 is formed at its upper end with a socket 31 which communicates with the opening 30.

The casing 16 is grooved at its top, as indicated at 32 and the top of the member 28 is shouldered as at 33. Extending into the groove 32, seated on the top of the member 28 and abutting against the shoulder 33, as well as extending across the opening 30, is a combined guide and support 34 carrying a spring controlled circuit opening and closing element 35, which has the contact 25 fixedly secured thereto and insulated therefrom. The forward portion of the combined guide and support 34, has depending therefrom, a pair of oppositely disposed flanged guides 36, only one of which is shown, for the element 35. The oppositely extending guides 36 are positioned within the top of the casing 16 and interposed between said top and the motor 27. See Figure 1. The rear end of the casing 16, at its top, is formed with an opening 37 for the passage of the element 35 and the latter extends into the opening 30 and is formed with a depending finger piece 38 to enable the operator to shift the element 35 rearwardly so that the contact 25 will engage the contact device 26 and close the motor circuit. The shifting of the element 35 rearwardly, is had against the action of a coiled spring 39, which is mounted in the socket 31 and bears against the rear end of the element 35, and said spring 39 provides means for normally maintaining the element 35 shifted in a forward direction so that the contact 25 will be out of engagement with the contact device 26.

The base 12, at the longitudinal center thereof, is formed with a lengthwise extending opening 40, which is arranged forwardly of the member 28 and extends under the rear portion of the casing 16. Pivotally connected in the opening 40, as at 41, is a spring controlled locking lever 42 provided with a nose 43 and a finger piece 44. Secured to the base 12 and engaging the lever 42 is a spring 45 acting to maintain the nose 43 in the opening 7 so as to lock the base to the track whereby the base and track will be bodily shifted together. The finger piece 44 provides means whereby the lever 42 can be shifted to move the nose 43 out of the opening 7 and permit of the base being shifted on the track.

That portion of the combined guide and support 34, which is mounted in the groove 32, and the side walls of the groove 32 are constructed to provide a dovetail connection therebetween, and the said combined guide and support is secured to the handle member 28 by a hold-fast device 46.

*The manually shiftable spring controlled combined guard and saw blade carrier.*—The combined guard and carrier acts to support the saw blade when the latter is active or inactive and further acts to hold the saw blade in safety position whether the saw blade is inactive or is revolving, and the said combined guard and carrier comprises a skeleton semi-circular casing 47 having a knob or hand grip 48 secured to the top centrally thereof. Each side of the casing is formed with an inset portion, centrally of its bottom as at 49 and each inset portion is provided with an inwardly extending semi-circular flange 50. The inset portion 49 provides a shoulder 51 against which is positioned a combined closure and wear plate, which when the saw blade 53 is active rides against a flange 3. The combined closure and wear plates are indicated at 52 and 52'. Secured to the inner face of the plate 52 is a semi-circular flanged retaining member 54 which co-acts with a flange 50 for maintaining a bearing device 55 in position with respect to the end 56 of a saw blade operating shaft 57.

The plate 52' has secured to its inner face at its lower end a flanged semi-circular retaining member 58, which co-acts with the other flange 50, for maintaining a bearing element 59 in position with respect to a tubular extension 60, which projects from a worm gear 61 forming an element of the operating mechanism for the saw blade and which mechanism will be hereinafter referred to.

The shaft 57 is peripherally threaded for a portion of its length, as indicated at 62 and that end of the shaft 57, opposite the end 56 thereof, is formed with a polygonal reduced terminal 63 which engages in a polygonal-shaped socket 64 formed in the extension 60.

The saw blade 53 is mounted on the shaft 57 and positioned centrally with respect to the casing 47, and is of a diameter to permanently depend from the bottom of said casing. Positioned against each side of the saw blade 53 is a collar 65, and said collars are secured in abutting engagement with the plate 53 through the medium of the clamping nuts 66 which engage the threads 62 on the shaft 57. The plates 52 and 52' are secured to the sides of the casing 47 by the hold-fast devices 67.

The rear end of the casing 47 is formed with a pair of rearwardly extending apertured lugs 68, each of which extend between a pair of apertured lugs 69, which project forwardly from the forward end of the base 12. The lugs 68 align with the lugs 69, and mounted in said aligning lugs is a shaft 70 carrying a controlling spring 71 for the casing 47, and the spring 71 constitutes means for maintaining casing 47 normally in an elevated position, and when shifted to such position the saw blade 53 is bodily carried therewith so as to move the saw blade to safety position. One end of the controlling spring is connected as at 72, to one of the lugs 69 and the other end of the controlling spring 71, is connected as at 73, to the rear end of the casing 47. See Figure 2. The casing 47 is manually shifted, against the action of the spring 71, by the operator and the knob 48 enables the convenient shifting of the casing 47 manually when desired.

*Operating mechanism for the saw blade.*— This mechanism is employed for driving shaft 57 to revolve the saw blade 53, and is connected with and bodily shifted by the combined guard and carrier, and such mechanism includes an open bottom housing 74 connected to and extending laterally from one side of the casing 47. The housing 74 is secured to that side of the casing 47 to which the combined closure and wear plate 52' is connected. The housing 74 at its top is provided with a flange 75 through which extends hold-fast devices 76 for securing said housing to the casing 47. The ends of the housing 74 are cut away, as at 77, to provide a clearance for the track rail 2.

and the outer side wall of the housing 74 has its inner face provided with an inwardly extending angular flange 78 for the reception of a bearing element 79, which surrounds a cylindrical extension 80 projecting from worm gear 61. The plate 52' is formed with an opening 81 for the gear 61. The forward end of the housing 74 is indicated at 82 and the rear end at 83. The said forward end carries a bearing element 84 for the forward end of a shaft 85, which is provided with a worm 86 meshing with the worm gear 61, for the purpose of driving it whereby the saw blade 53 and its shaft will be revolved. The rear end 83 of the housing 74 is formed with an opening 87 for the passage of the shaft 85 and the latter is of a length to extend in close proximity to the base 12, but above the same.

*Transmission mechanism.*—This mechanism is employed for driving the saw blade operating mechanism from the motor 27 and the said transmission mechanism includes a transmission shaft 88, mounted in spaced bearings 89 supported within the auxiliary housing 19. The shaft 88, between the bearings 89, carries a pinion 90 and said shaft 88 projects forwardly from the auxiliary housing 19 towards the shaft 85. A universal joint connection 91 is interposed between the forward end of shaft 88 and the rear end of the shaft 85, as well as being connected to the said shafts. Arranged within the housing 18 and extending into the housing 19 and further meshing with the pinion 90, for the purpose of driving it, is a large gear wheel 92, which is carried on the forwardly projected end of the motor shaft 93. The setting up of the transmission mechanism, with respect to the saw blade operating mechanism in the manner as stated, provides for the revolving of saw blade 53 when the motor circuit is closed.

*Combined cut gauging and setting device.*—This device is employed for regulating or controlling depth of the cut of the saw blade and further for maintaining the blade in set position. The said device comprises a gauge in the form of a bar provided with graduations and said bar includes a rear portion 94, an inwardly extending intermediate portion 95 and an inset forward portion 96 which is pivotally connected to that side of the casing 47 to which is secured the plate 52. The forward end of the portion 96 is provided with an opening 97 through which extends a pivot bolt 98 having threaded engagement with the said side of the casing 47. The bolt 98 projects laterally from the casing 47 and carries a collar 99 which is interposed between the casing and the portion 97 of the gauge. The head of the bolt 98 is indicated at 100 and interposed therebetween and the portion 97 of the gauge bar is a collar 101 of greater thickness than the collar 99. The outer end of the collar 101 is countersunk as at 102 for the reception of the head 100.

The rear portion 94 of the gauge is formed with a lengthwise extending slot 103 of a length to extend from a point removed from the rear end of the portion 94 to a point in proximity to the portion 95. The outer face of the portion 94 is provided with graduations, as indicated at 104. Slidably mounted on the portion 94 is an adjustable stop 105 provided with a set screw 106 for fixing the stop in its adjusted position.

Projecting laterally from the casing 16 is a setting means for slidably connecting the gauge to said casing 16 and which permits of the gauge shifting forwardly or rearwardly with respect to the casing, or to an inclined position thereof, as shown in dotted lines in Figure 1. The said setting device consists of a set screw 107 which connects with the casing 16 and extends through the slot 103 in the portion 94 of the gauge. Engaged by the set screw 107 and interposed between the portion 94 in casing 16 is a lug 108, and mounted on the set screw 107 and interposed between the portion 94 and the head 109 of the set screw 107 is a collar 110.

The set screw 107 when tight holds the saw blade at any desired position. By loosening the set screw 106, the stop 105 can be adjusted on the portion 94 to permit of the saw being adjusted to any desired depth, yet said stop 105 does not prevent the saw blade being shifted to safety position when the set screw 107 is loosened. The forward end wall of the slot 103 limits the elevating movement of the combined guard and carrier when the latter is shifted upwardly through the action of the spring 71.

The registering openings 8 and 11, and the registering openings 9 and 10 provide means for the passage of gauge bars, one of which is shown in Figure 4 and indicated at 111. The set screws 112 are employed for fixedly securing the track in the position to which it has been adjusted on said bars. The set screws for the bar at the rear end of the track are not shown. The bars serve as a gauge when making several parallel cuts, and the track can be shifted to the desired position of adjustment when the set screws 112 are loosened.

The portable support, which includes the base or carriage 12 may at any time be removed from the track and when removed the saw is reduced in weight and size, allowing the saw to be used in a much smaller space. When the portable support is removed from the track, it is operated in the same manner, as hereinbefore referred to, with the exception that the base or carriage slides directly on the work and is pushed over the same as one would do with a plane.

From the construction described, it will be readily seen that in placing the saw on the work, though the saw blade be revolving at a high rate of speed, no sawing action can be accomplished until the saw blade is pushed down by the knob 48 until the saw teeth project below the track. It will also be seen that there are three ways by which a sawing action can be accomplished, one of which has been referred to when the portable support is removed from the track, another of which is by holding the saw blade in active position and sliding the portable support and track bodily together over the work as one would do with a plane, and the other of which is by releasing the portable support from the track and then sliding the portable support over the track, while the track remains stationary. When making longer cuts it is necessary that the portable support and track be bodily moved over the wood, yet in short cuts, such as squaring off, it is much more convenient to allow the track to remain stationary and move the portable support over the track.

It is thought that the many advantages of a motor driven hand saw, in accordance with this invention, can be readily understood, and although the preferred embodiment of the construction is as illustrated and described, yet it it is to be understood that changes in the details of construction can be had which will fall within the scope of the invention as claimed.

What I claim is:—

1. In a motor driven hand saw, a normally elevated, manually positioned, spring controlled, combined blade guard and carrier including an open bottom casing pivoted at its rear end and provided therewith a rotary saw blade shaft and operating means for the latter disposed transversely and lengthwise of said casing, and a driving mechanism arranged rearwardly of said casing and having a universal joint connection with that portion of said operating means extending lengthwise of the casing.

2. In a motor driven hand saw, a carriage, a motor mounted thereon, a normally inclined, manually positioned, adjustable, spring controlled, combined saw blade guard and carrier including an open bottom casing having arranged therein a rotary saw blade shaft bodily shiftable therewith, means for pivotally connecting said casing at one end to said carriage, an adjustable combined cut gauging and saw blade setting device pivotally connected at one end to said casing and slidably connected at the other end to said carriage, and an operative drive connection between the motor and the saw blade shaft.

3. In a motor driven hand saw, a carriage, a motor mounted thereon, a normally elevated, manually positioned, adjustable, spring controlled, combined saw blade guard and carrier including an open bottom casing having arranged therein a rotary saw blade shaft bodily shiftable therewith, means for pivotally connecting said casing at one end to said carrier, an adjustable combined cut gauging and saw blade setting device pivotally connected at one end to said casing and slidably connected at its other end to said carriage, said combined saw blade guard and carrier further including means for operating the saw blade shaft, and an operative drive connection leading from said motor and universally connected with the operating means for the saw blade shaft.

4. In a motor driven hand saw, a portable support, a motor mounted thereon, a spring controlled combined saw blade guard and carrier arranged forwardly of and pivotally connected at its rear end to said support, a rotary saw blade, a shaft therefor journaled in said combined guard and carrier, operating means for said shaft supported by said combined guard and carrier, a transmission mechanism on said support and operated from said motor and having a universal joint connection with said operating means, and means slidably connected to said support and pivotally connected to said combined guard and carrier for adjusting the latter to control the depth of the cut by the blade.

5. In a motor driven hand saw, a pivoted saw blade guard having arranged therein a rotary saw blade shaft, said guard further including bearings and operating means for said shaft, a blade carried by the shaft and projecting from the guard, means engaging with the guard for automatically swinging it upwardly on its pivot to maintain the blade in an elevated position, a driving mechanism for said operating means, said mechanism arranged exteriorly of the guard and having a universal joint connection with said operating means, a bodily shiftable carriage for said driving mechanism, and means for pivoting the guard to said carriage whereby the former will be carried with the carriage on the shifting of the latter.

6. In a motor driven hand saw, a pivoted saw blade guard having arranged therein a rotary saw blade shaft, said guard further including bearings and operating means for said shaft, a blade carried by the shaft and projecting from the guard, means engaging with the guard for automatically swinging it upwardly on its pivot to maintain the blade in an elevated position, a driving mechanism for said operating means, said mechanism arranged exteriorly of the guard and having a universal joint connection with said operating means, a carriage for said driving mechanism, means for pivoting the guard to said carriage, and adjustable means slidably connected at one end to the carriage and pivotally connected at its other end to said guard for adjusting the latter to gauge the cut of the saw blade.

7. In a motor driven hand saw of that type including a pivoted spring controlled guard for a rotary saw blade, a combined cut gauging and saw blade setting device comprising a slotted gauge element adapted to be pivotally connected at one end to the saw blade guard and adapted to have its other end slidably connected to a support, and an adjustable stop mounted on said element.

In testimony whereof, I affix my signature hereto.

CHARLES W. CROGAN.